A. LAURITZEN.
POTATO SEPARATOR.
APPLICATION FILED JUNE 16, 1916.
1,239,922.
Patented Sept. 11, 1917.
Fig. 1.
Fig. 2.
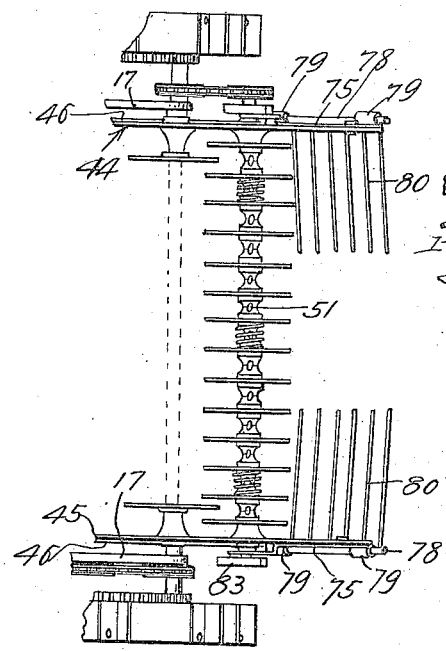
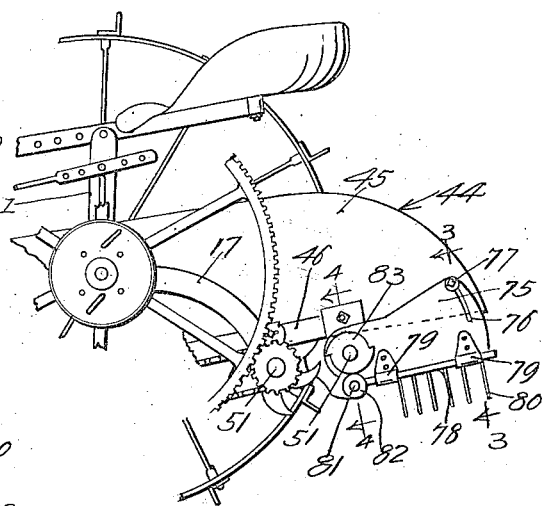
Fig. 3.
Fig. 4.
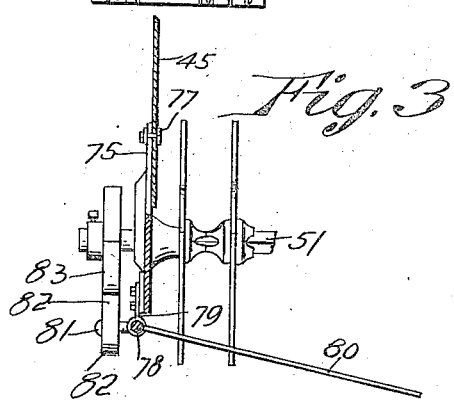
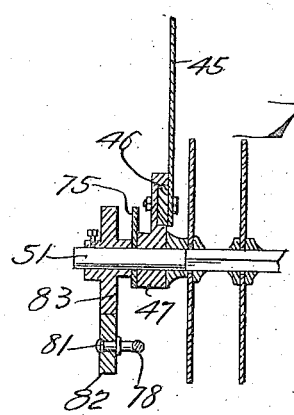
Witnesses
Albert Lauritzen,
Inventor
Attorneys

UNITED STATES PATENT OFFICE.

ALBERT LAURITZEN, OF CHARLOTTE, MICHIGAN.

POTATO-SEPARATOR.

1,239,922.   Specification of Letters Patent.   Patented Sept. 11, 1917.

Application filed June 16, 1916.   Serial No. 104,038.

*To all whom it may concern:*

Be it known that I, ALBERT LAURITZEN, a citizen of the United States, residing at Charlotte, in the county of Eaton and State of Michigan, have invented a new and useful Potato-Separator, of which the following is a specification.

The present invention appertains generally to potato diggers, such as shown in my co-pending application Serial No. 104,039 filed even date herewith.

It is the object of the invention to provide novel and improved means for placing the potatoes in a row which are delivered from the trunk, whereby the potatoes can be readily picked up, and furthermore, the potatoes will be prevented from being scattered promiscuously over the soil, which will prevent some of the potatoes being crushed by the operation of the digger over the next row.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the device at the rear end of the trunk.

Fig. 2 is a side elevation thereof.

Figs. 3 and 4 are enlarged sectional details taken on the lines 3—3 and 4—4, respectively, of Fig. 2.

The entire machine is disclosed in the application above referred to, and since the present invention relates solely to the device for placing the potatoes in a row, only the rear portion of the machine is shown in the accompanying drawing, but reference can be had to said application for the construction and operation of the machine. The machine includes a trunk 44 having the upstanding side plates 45 to the lower edges of which bars 46 are secured, and bearings 47 are attached to said bars 46 and have journaled therein transverse shafts 51 forming a part of the grid which sifts the potatoes and works the same rearwardly. The next to the last shaft 51 is carried by brackets 17 of a wheel mounted frame or structure 1, whereby the rear end of the trunk is pivotally mounted.

The present device includes a pair of rearwardly projecting plates or wings 75 overlapping the rear ends of the plates 45, and having their forward ends pivotally mounted upon the rear shaft 51, whereby said wings 75 can swing upwardly and downwardly. The wings 75 are provided with arcuate slots 76 adjacent their rear ends receiving bolts or other stop elements 77 carried by the plates 45 adjacent their rear ends, whereby to limit the vertical movement of the wings 75. Rock shafts 78 are journaled in bearings 79 attached to the lower edges of the wings 75, and said rock shafts 78 have inwardly projecting tines providing forks 80, which project toward one another and which project slightly downward. The forward ends of the rock shaft 78 have outturned arms 81 upon which rollers 82 are mounted for rotation, and cams 83 are secured upon the ends of the rear shaft 51 and bear upon the rollers 82, whereby when the said shaft 51 is rotated, the cams 83 in engaging the rollers 82 will vibrate the same vertically, thus rocking the arms 81 and rock shafts 78 and swinging the forks 80 upwardly and downwardly. The adjacent ends of the forks 80 are spaced apart, so that the potatoes can drop therebetween onto the ground in a row, and those potatoes which fall onto the forks 80 roll off of the inner ends thereof. When the machine is in operation, the cams 83 in being rotated, will oscillate the forks 80, whereby to shake the potatoes off of the forks, to prevent the accumulation of potatoes upon the forks, and to provide a final sifting action. The wings 75 can be clamped at various positions, or the bolts 77 can be loosened, to enable said plates or wings to swing downwardly by gravity, and to be pushed upwardly when necessary due to the contact of the forks 80 or wings 75 with the ground or obstructions.

Having thus described the invention, what is claimed as new is:

1. In a machine of the character described, a trunk, a shaft carried thereby transversely thereof, an adjustable member carried by the trunk and adjustable about said shaft as a center, a rock shaft carried by said member and having a fork extending transversely at the delivery end of the trunk, means for holding said member in various positions relative to the trunk, and an operative connection between said shafts whereby the rotation of the first mentioned shaft oscillates the rock shaft and its fork at various positions of said member.

2. In a machine of the character described, a trunk, a transverse shaft carried thereby, rearwardly projecting wings mounted upon said shaft for swinging movement, the rear ends of said wings and trunk having coöperable means for holding the wings in different positions and for limiting the movements of said wings, rock shafts carried by the lower edges of said wings and having forks projecting downwardly at a slight angle, said forks projecting toward one another and having their adjacent ends spaced apart, the forks being located at the delivery end of the trunk, the forward ends of the rock shafts having outstanding arms, and cams secured upon the first mentioned shaft and coöperable with said arms for oscillating the forks.

3. In a machine of the character described, a trunk, a transverse shaft carried thereby, a rearwardly adjustable wing mounted upon said shaft for swinging movement, means for limiting the movement of the wing and holding it in different positions, a longitudinal rock shaft carried by the wing and having a fork at the delivery end of the trunk, said rock shaft having an outstanding arm, and a cam secured upon the first mentioned shaft above said arm for oscillating it and the fork.

In testimony that I claim the foregoing as my own, I have hereto affixed my signature in the presence of two witnesses.

ALBERT LAURITZEN.

Witnesses:
FRANK E. BEARD,
ALBERT L. GREEN.

Copies of this patent may be obtained for five cents each, by addressing the "Commissioner of Patents Washington, D. C."